(12) United States Patent
Sugiyama et al.

(10) Patent No.: US 9,751,434 B2
(45) Date of Patent: Sep. 5, 2017

(54) VEHICLE SEAT

(71) Applicant: TS TECH CO., LTD., Asaka-shi, Saitama (JP)

(72) Inventors: Shinji Sugiyama, Tochigi (JP); Kazunori Ishihara, Tochigi (JP); Shuichi Shimizu, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 141 days.

(21) Appl. No.: 14/735,221

(22) Filed: Jun. 10, 2015

(65) Prior Publication Data

US 2015/0274042 A1  Oct. 1, 2015

Related U.S. Application Data

(63) Continuation of application No. 13/793,369, filed on Mar. 11, 2013, now Pat. No. 9,079,509.

(30) Foreign Application Priority Data

| Mar. 14, 2012 | (JP) | ................................ | 2012-057854 |
| Mar. 14, 2012 | (JP) | ................................ | 2012-057855 |
| Mar. 23, 2012 | (JP) | ................................ | 2012-067470 |

(51) Int. Cl.
*B60N 2/427* (2006.01)
*B60N 2/02* (2006.01)
(Continued)

(52) U.S. Cl.
CPC ........... *B60N 2/42745* (2013.01); *B60N 2/02* (2013.01); *B60N 2/4228* (2013.01); *B60N 2/68* (2013.01); *B60N 2/72* (2013.01)

(58) Field of Classification Search
CPC .......... B60N 2/66; B60N 2/4278; B60N 2/42; B60N 2/643; A47C 4/62
(Continued)

(56) References Cited

U.S. PATENT DOCUMENTS 5,769,490 A * 6/1998 Falzon ................. B60N 2/6673
297/284.3
7,461,895 B2   12/2008 Holdampp et al.
(Continued)

FOREIGN PATENT DOCUMENTS

| JP | 2002-153352 A | 5/2002 |
| JP | 2005-138675 A | 6/2005 |

(Continued)

OTHER PUBLICATIONS

Office Action issued in counterpart Japanese Patent Application No. 2012-057854 on Aug. 25, 2015, and corresponding English translation.
(Continued)

*Primary Examiner* — Sarah McPartlin
(74) *Attorney, Agent, or Firm* — Hamre, Schumann, Mueller & Larson, P.C.

(57) ABSTRACT

A vehicle seat includes a pressure-receiving member disposed rearwardly of an occupant between left and right side frames, and a rocking mechanism configured to cause a left side or a right side of the pressure-receiving member to move frontward and rearward. The rocking mechanism includes a first link member provided pivotally, a second link member provided pivotally on the first link member and pivotally connected to the pressure-receiving member, and an actuator configured to cause the first link member and the second link member to pivot.

20 Claims, 11 Drawing Sheets

(51) Int. Cl.
*B60N 2/72* (2006.01)
*B60N 2/42* (2006.01)
*B60N 2/68* (2006.01)

(58) Field of Classification Search
USPC .......................... 297/216.13, 216.14, 284.4
See application file for complete search history.

(56) References Cited

U.S. PATENT DOCUMENTS

| | | | |
|---|---|---|---|
| 7,874,616 B2 * | 1/2011 | D'Agostini | .......... B60N 2/4228 297/216.12 |
| 7,971,934 B2 | 7/2011 | Lapointe et al. | |
| 8,562,073 B2 | 10/2013 | Niitsuma et al. | |
| 2002/0008417 A1 * | 1/2002 | Holst | .................. B60N 2/0232 297/284.4 |
| 2011/0204693 A1 | 8/2011 | Nitsuma | |

FOREIGN PATENT DOCUMENTS

| | | |
|---|---|---|
| JP | 4569293 | 7/2006 |
| JP | 2010-57824 A | 3/2010 |
| JP | 2010-83268 | 4/2010 |

OTHER PUBLICATIONS

Office Action issued in counterpart Japanese Patent Application No. 2012-067470 on Sep. 15, 2015, and corresponding English translation.

* cited by examiner

VEHICLE SEAT

CROSS-REFERENCE TO RELATED APPLICATION(S)

This application claims priority from Japanese Patent Applications Nos. 2012-057854 and 2012-057855 filed on Mar. 14, 2012, and Japanese Patent Application No. 2012-067470 filed on Mar. 23, 2012, the disclosures of which are incorporated herein by reference in their entirety.

FIELD

The present invention relates to a vehicle seat having a seat cushion and a seat back.

BACKGROUND

A vehicle seat comprising a pressure-receiving member disposed rearwardly of an occupant between left and right side frames and configured to be movable rearward relative to the left and right side frames is hitherto known in the art (see US 2011/0204693 A1). Such a pressure-receiving member as described therein is configured such that an occupant is supported with a cushion material at his/her back in a normal sitting state, and that an upper body of the occupant can be subsided into the seat back by a rearward movement of the pressure-receiving member pushed back by the upper body of the occupant in a rear-end collision. As the upper body of the occupant is subsided into the seat back, a head of the occupant comes closer to the head rest and supported thereon, and thus an impact given to a neck of the occupant can be alleviated.

Another vehicle seat in which a portion of the seat back is allowed to rock frontward and rearward so as to properly support a centrifugal force applied to an occupant during cornering of a vehicle is also known in the art (see JP 4569293 B2). To be more specific, this seat configured as described therein comprises a pair of left and right side frames, and a pressure-receiving member disposed between the side frames and configured to support the portion of the seat back (particularly only a laterally central portion thereof) from a rear side, wherein both ends of the pressure-receiving member are pivotally supported by single-piece link members pivotally supported on the side frames.

In addition, the left and right link members are connected to a pedal by a wire so that operation by an operator depressing the pedal causes the portion of the seat back to make a rocking motion through the actions of the wire, link members and the pressure-receiving member.

However, the single-piece configuration of the link members provided at the left and at the right only permits a small amount of rocking motion of the pressure-receiving member, and thus would possibly be unable to properly receive a centrifugal force applied to the occupant during cornering of a vehicle.

It would be desirable to provide a vehicle seat capable of properly receiving such a centrifugal force applied to an occupant during cornering of a vehicle.

SUMMARY

In contrast to the conventional configuration in which the pressure-receiving member is configured to support only a portion (the laterally central portion) of the seat back, the applicant of the present application has conceived an improved configuration for receiving a centrifugal force given to an occupant during cornering of a vehicle, in which the pressure-receiving member comprises the central portion (pressure-receiving portion) and two support portions each configured to extend from each of the left and right ends of the pressure-receiving portion in a laterally outward and frontward direction and to support side portions (at both sides of the central portion) of the seat back. Moreover, the applicant of the present application has conceived that a connecting wire for supporting the pressure-receiving member from a rear side thereof is provided and both ends of the connecting wire are connected to link members so that the link members are pivoted relative to the side frames to cause the pressure-receiving member to rock.

However, in this configuration, to properly receive the load from an occupant by the support portions, the support portions should necessarily be supported from a rear side; in cases where the support portions are supported by the connecting wire, the rigidity of the connecting wire would be so weak insufficient to properly receive the load applied.

The applicant of the present invention has further conceived that, in order to properly receive the centrifugal force applied to an occupant during cornering of a vehicle, a pair of left and right actuators are provided to cause the left and right end portions of the pressure-receiving member to rock frontward and rearward in accordance with the cornering of the vehicle. In this configuration, the pair of the left and right actuators would preferably be arranged compactly around the support portions extending in the laterally outward and frontward directions.

It is one aspect of the present invention to provide a vehicle seat capable of properly receiving a load applied to support portions from an occupant.

It is another aspect of the present invention to provide a compact vehicle seat with the support portions and the actuators are arranged in a compact space.

More specifically, according to one or more embodiments, a vehicle seat comprises a seat cushion, a seat back which includes left and right side frames, a pressure-receiving member disposed rearwardly of an occupant between the left and right side frames, and a rocking mechanism configured to cause a left side or a right side of the pressure-receiving member to move frontward and rearward. The rocking mechanism includes a first link member provided pivotally, a second link member provided pivotally on the first link member and pivotally connected to the rocking mechanism, and an actuator configured to cause the first link member and the second link member to pivot.

With this configuration, the first link member and the second link member (a set of at least two link members disposed at the left or at the right) can be configured to provide a greater stroke of a pivotal motion of the left or right side of the pressure-receiving member in the front-rear direction, and thus the pressure-receiving member can be rocked greatly so that the centrifugal force applied to the occupant during cornering of the vehicle can be received effectively by the pressure-receiving member.

In the configuration as described above, the pressure-receiving member may preferably but not necessarily be elastically deformable.

With this feature, the pressure-receiving member can be deformed to fit the occupant, so that the centrifugal force applied to the occupant can be received more effectively by the pressure-receiving member.

In the configuration as described above, the pressure-receiving member may preferably but not necessarily include a pressure-receiving plate configured to support a back of the occupant, and a connecting wire disposed rearwardly of the pressure-receiving plate, wherein the second link member is connected to the connecting wire.

With this additional configuration in which the back of the occupant is supported by the pressure-receiving plate, the occupant is less likely to feel uncomfortable, for example, in comparison with a case with a conventional configuration in which a pressure-receiving member is shaped like a rectangular bar. Moreover, since the second link member is connected to the connecting wire, a structure of their connected portions can be simplified, for example, in comparison with an alternative configuration in which the second link member is connected to the pressure-receiving plate.

In the configuration as described above, an end portion of the connecting wire may preferably but not necessarily be pivotally engaged with a hole formed in an end portion of the second link member.

With this additional feature, the structure can be simplified, for example, in comparison with an alternative configuration in which an end portion of the connecting wire is bent into an annular shape and this end portion is hanged on a hook-shaped portion formed on the second link member.

In the configurations as described above, the rocking mechanism may, preferably but not necessarily, further include a biasing member disposed between the first link member and the second link member and configured to bias the second link member to an initial position thereof.

With this additional feature, the second link member can be returned to the initial position by the biasing force of the biasing member.

In the configurations as described above, the biasing member may preferably but not necessarily include a torsion spring having a coiled portion which is disposed to enclose a rotary shaft of the second link member by which the second link member is pivoted on the first link member.

With this additional configuration, in which the coiled portion of the torsion spring is disposed to enclose the rotary shaft of the second link member, the rocking mechanism can be easily miniaturized, for example, in comparison with an alternative configuration in which the coiled portion of the torsion spring is disposed so as not to enclose the rotary shaft of the second link member.

In the configurations as described above, the pressure-receiving member may preferably but not necessarily include a pressure-receiving portion configured to support a back of the occupant, and a pair of support portions provided at left and right end portions of the pressure-receiving member and extending in a leftward-and-frontward direction and in a rightward-and-frontward direction, respectively, to support upper body side regions of the occupant, wherein the second link member is arranged to contact a corresponding support portion.

With this additional configuration, in which the second link member is arranged to contact the corresponding support portion, the load imposed on the support portions from the occupant can be received more effectively by the second link member, for example, in comparison with an alternative configuration in which the load imposed on the support portions from the occupant is received by the connecting wire. The pressure-receiving member may further include a connecting wire disposed to support the pressure-receiving portion from a rear side thereof, and the second link member may be connected to the connecting wire.

In the configurations as described above, the second link member may preferably but not necessarily be configured to contact the support portion at least when the pressure-receiving member is in a frontmost position.

With this additional configuration, in which the support portion is supported by the second link member when the pressure-receiving member is in the frontmost position, the centrifugal force applied to the occupant during cornering of the vehicle can be supported more effectively by the second link member.

In the configurations as described above, each support portion may preferably but not necessarily include a first projection protruding rearward.

With this feature, the support portion may be provided with a higher rigidity.

In the configurations as described above, alternatively, each support portion may preferably but not necessarily include a plurality of first projections protruding rearward.

With this feature, as well, the support portion may be provided with a higher rigidity.

In the configurations as described above, the second link member may be configured to contact a portion of the support portion between the first projections at least when the pressure-receiving member is in a frontmost position.

With this additional configuration, in which the second link member is disposed between the first projections, an undesirable dislocation of the second link member in a direction of arrangement of the first projections can be blocked by the first projections.

In the configurations as described above, the pressure-receiving portion may preferably but not necessarily include a second projection protruding rearward, wherein the pressure-receiving portion and the support portions are formed integrally in a single-piece construction, and the first projection is continuous with the second projection.

With this feature, the rigidity of boundary portions of the pressure-receiving portion and the support portions at and around an interface therebetween can be enhanced, so that deformation of the support portions relative to the pressure-receiving portion can be suppressed.

In the configurations as described above, the first projection may preferably but not necessarily be tilted relative to a horizontal plane.

With this feature, the load imposed from the occupant on the support portions from various directions can be efficiently received by a simple structure, in comparison with an alternative structure in which the first projection is shaped like a cross.

In the configurations as described above, the second link member may be configured to contact the first projection.

With this feature, the first projection that is a high rigidity portion is received by the second link member, and thus the load of the occupant can be received effectively by the second link member.

In the configurations as described above, the first projection may preferably but not necessarily be formed along a direction parallel to a horizontal plane, wherein the second link member is configured to pivot in a horizontal plane.

With this feature, for example, if the second link member is configured to contact the first projection, the second link member caused to pivot can be prevented from getting disengaged from the first projection, and thus the first projection can be supported reliably by the second link member. Moreover, for example, if the second link member is configured to contact a portion of the corresponding support portion between the first projections, the second link member can be prevented from getting disengaged from the portion between the first projections.

In the configurations as described above, the pressure-receiving member may include a pressure-receiving portion configured to support a back of the occupant, and a pair of support portions provided at left and right end portions of the pressure-receiving member and extending in a leftward-and-frontward direction and in a rightward-and-frontward direction, respectively, to support upper body side regions of the occupant, wherein the actuator is disposed rearwardly of a corresponding support portion, to overlap the corresponding support portion as viewed in a front-rear direction.

With this additional configuration, in which the actuator is disposed to overlap the support portion as viewed in the front-rear direction, the vehicle seat can be miniaturized, for example, in comparison with an alternative configuration in which the actuator is disposed so as not to overlap the support portion as viewed in the front-rear direction.

In the configurations as described above, the actuator may preferably but not necessarily be disposed at a laterally inner side of a corresponding side frame.

With this additional configuration, in which the actuator is disposed at a laterally inner side of the side frame, the vehicle seat can be miniaturized in the lateral direction, for example, in comparison with an alternative configuration in which the actuator is disposed at a laterally outer side of the side frame. In other words, if the actuator is disposed, for example, at a laterally outer side of the side frame, the vehicle seat is disadvantageously upsized in the lateral direction, but this problem can be overcome by the above-described additional configuration.

In the configurations as described above, the actuator may preferably but not necessary have an elongated shape of which a longitudinal direction is arranged along a corresponding side frame.

With this additional configuration, in which the elongated actuator is arranged along the side frame, the vehicle seat can be miniaturized in the front-rear direction, in comparison with an alternative configuration in which the elongated actuator is tilted in the front-rear direction. In other words, if such an elongated actuator is arranged, for example, at a tilt in the front-rear direction, the actuator protrudes beyond the side frame in the front-rear direction, with the result that the vehicle seat is disadvantageously upsized in the front-rear direction, but this problem can be overcome by the above-described additional configuration.

In the configurations as described above, preferably but not necessarily, each support portion may be disposed laterally opposite to a corresponding side frame, and the actuator may be disposed between the support portion and the corresponding side frame in a lateral direction.

With this additional configuration, in which the actuator is disposed between the support portion and the side frame disposed laterally opposite to each other, the vehicle seat can be miniaturized in the front-rear direction, for example, in comparison with another configuration in which the support portion and the side frame is not laterally opposite to each other or yet another configuration in which the actuator is not disposed between the support frame and the side frame. In other words, for example, if the support portion and the side frame are not opposite to each other or the support frame is not disposed between the support frame and the side frame, the vehicle seat is disadvantageously upsized, but this problem can be overcome by the above-described additional configuration.

In the configurations as described above, a front end portion of each support portion may preferably but not necessarily be configured to extend along an outer surface of the actuator in a laterally outside direction.

With this additional configuration, in which the front end portion of the support portion is configured to extend along the outer surface of the actuator in the laterally outside direction, the vehicle seat can be miniaturized in the front-rear direction, for example, in comparison with an alternative configuration in which the front end portion of the support portion is configured to extend straight in an obliquely frontward direction. In other words, if the front end portion of the support portion is, for example, configured to extend straight in an obliquely frontward direction, the vehicle seat is disadvantageously upsized in the front-rear direction, but this problem can be overcome by the above-described additional configuration.

In the configurations as described above, preferably but not necessarily, each support portion may be configured to include a projection protruding rearward, and the actuator may be separate from the projection.

With this additional configuration, the rigidity of the support portion can be enhanced by the projection. Moreover, the actuator arranged separate from the projection can be prevented from being damaged by the projection which would interfere with the actuator if the actuator is arranged in contact with the projection. In other words, if the support portion includes no such projection, the rigidity of the support portion disadvantageously becomes relatively lower, but this problem can be overcome by the above-described additional configuration of the support portion with the projection. In addition, if the actuator is, for example, disposed in contact with the projection, the projection would disadvantageously interfere with the actuator and damage the actuator, but this problem can be overcome by the above-described arrangement of the actuator separate from the projection.

In the configurations as described above, preferably but not necessarily, the pressure-receiving member may further include a connecting wire configured to support the pressure-receiving portion and the support portions from rear sides thereof, left and right end portions of the connecting wire being connected with corresponding second link members each provided in the rocking mechanism, wherein the pressure-receiving portion and the support portions include engageable claws configured to engage with the connecting wire whereby the pressure-receiving member is supported by the connecting wire, and wherein an engageable claw provided in each support portion is formed integrally with the projection in a single-piece construction.

With this additional configuration, the support portion can be caused to rock effectively by the connecting wire engaged with the engageable claws each formed integrally with the projection (high-rigidity portion) of the support portion because the connecting wire engaged with the engageable claws presses the high-rigidity projection. In other words, if the connecting wire is arranged to press a relatively lower-rigidity portion of the support portion, the support portion would not be caused to rock satisfactorily, but this problem can be overcome by the above-described additional configuration.

In the configurations as described above, preferably but not necessarily, the pressure-receiving member may further include a connecting wire configured to support the pressure-receiving portion from a rear side thereof, left and right end portions of the connecting wire being connected with corresponding second link members each provided in the rocking mechanism, wherein the pressure-receiving portion includes engageable claws configured to engage with the connecting wire whereby the pressure-receiving member is supported by the connecting wire, and wherein the engageable claws are provided at laterally outer end portions of the pressure-receiving portion.

With this additional configuration, in which the laterally outer end portions of the pressure-receiving portion can be pressed by the connecting wire, the pressure-receiving portion can be caused to rock satisfactorily. In other words, if the engageable claws are provided, for example, generally in the laterally center portion of the pressure-receiving portion, the pressure-receiving portion would disadvantageously be caused to rock satisfactorily by the connecting wire, but this problem can be overcome by the above-described additional configuration.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which.

DETAILED DESCRIPTION OF THE EMBODIMENTS

A detailed description will be given of an illustrative embodiment of the present invention with reference to the drawings. In the following description, first, a general configuration of a car seat as an example of a vehicle seat is described in brief, and then the features related to the present invention are described in detail.

Figure 1:
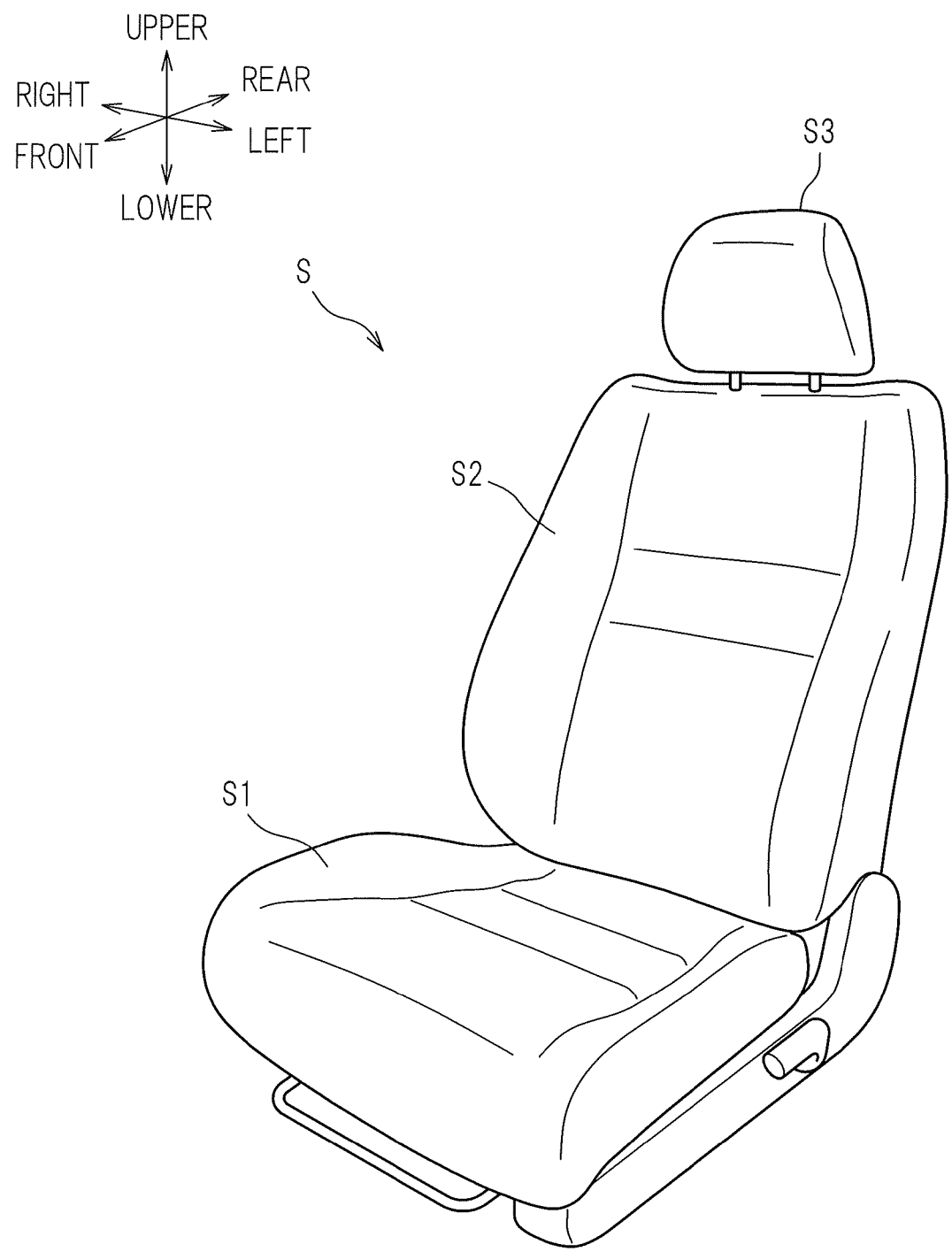
FIG. 1 is a perspective view of a car seat as a vehicle seat according to one exemplary embodiment.

As shown in FIG. 1, a car seat S, which is a seat for use in a driver's seat of an automobile, mainly includes a seat cushion S1, a seat back S2, and a head rest S3.

Figure 2:
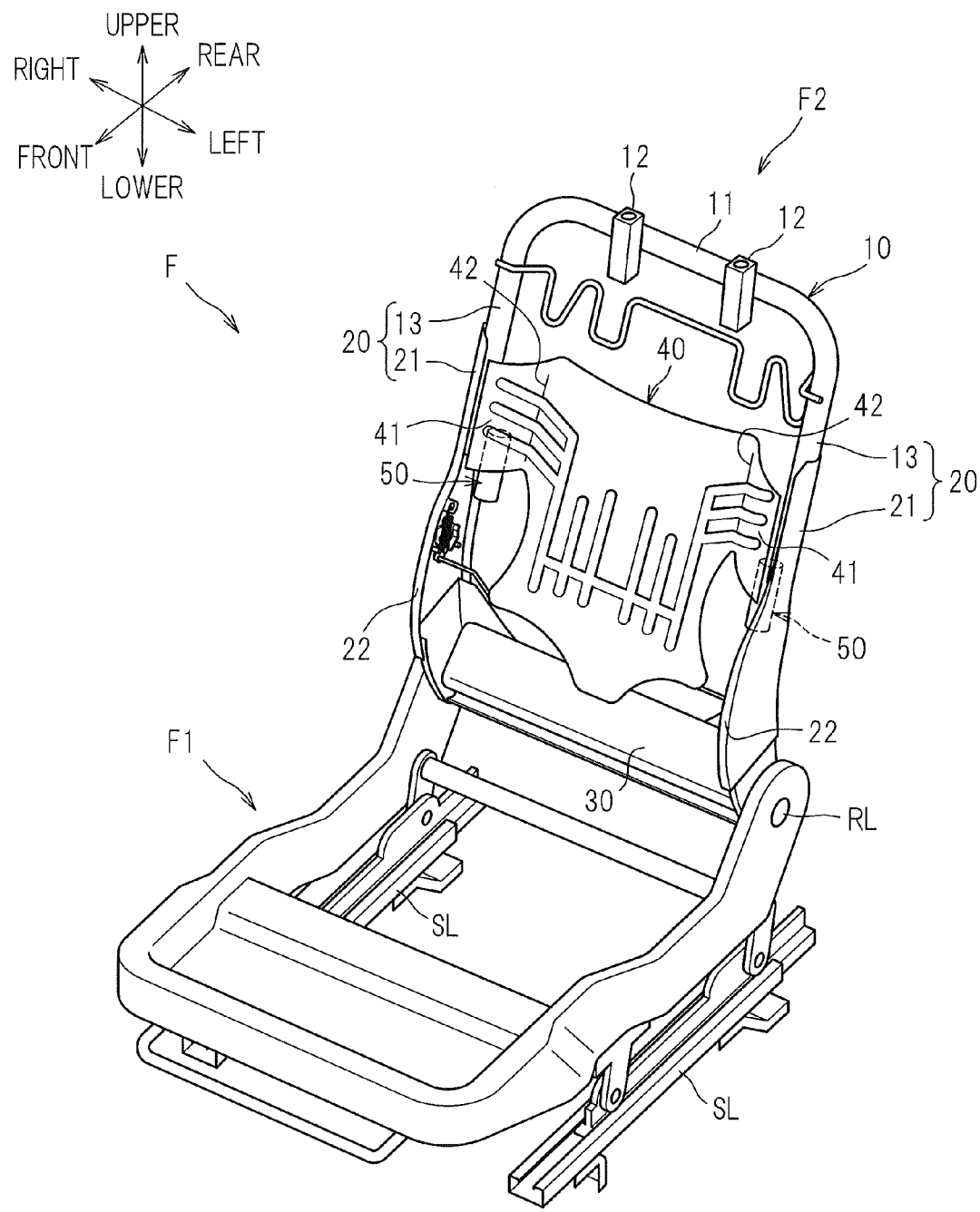
FIG. 2 is a perspective view of a seat frame incorporated in the car seat.

The seat cushion S1 and the seat back S2 incorporate a seat frame F as shown in FIG. 2. The seat frame F is mainly composed of a seat cushion frame F1 which constitutes a frame of the seat cushion S1 and a seat back frame F2 which constitutes a frame of the seat back S2. The seat cushion S1 is formed by covering the seat cushion frame F1 with a seat cushion pad made of cushion material such as urethane foam and a skin material made of synthetic leather or fabric, etc.

The seat back S2 is formed by covering the seat back frame F2 with a seat back pad made of cushion material and a skin material made of synthetic leather or fabric, etc.

The seat cushion frame F1 is installed on the floor of the automobile via slide rails SL. This makes it possible to adjust the position of the car seat S in the front-rear direction. A lower portion of the seat back frame F2 is pivotally connected via a reclining mechanism RL to a rear portion of the seat cushion frame F1. This makes it possible to tilt the seat back S2 relative to the seat cushion S1 in the front-rear direction.

In describing the embodiment, the front/rear, left/right (lateral), and upper/lower (upward/downward) directions are designated as from the view point of an occupant who is sitting on the car seat S.

Figure 3:
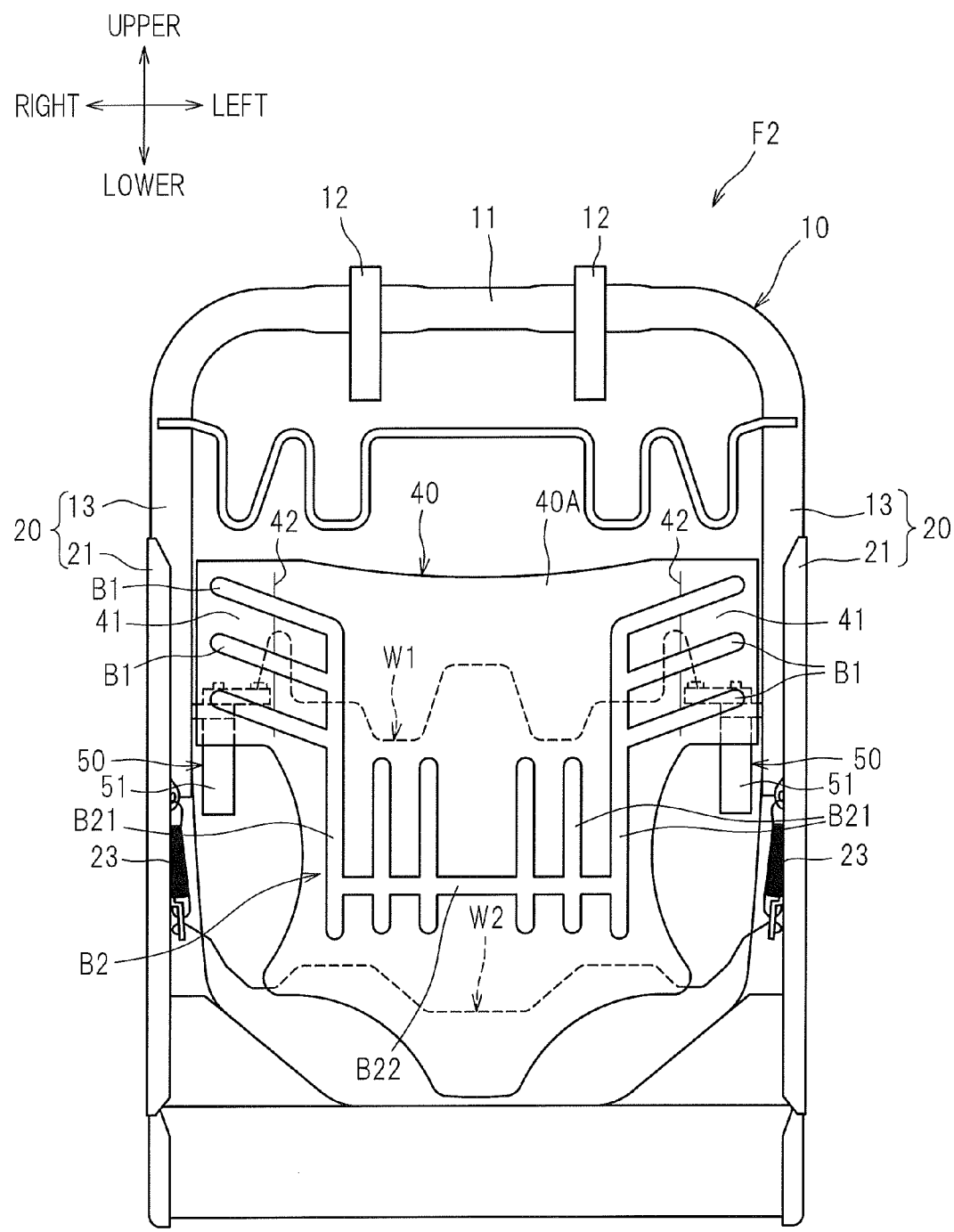
FIG. 3 is a front elevation of a seat back frame which constitutes a seat frame.

The seat back frame F2 mainly includes an upper frame 10, left and right side frames 20, and a lower frame 30. The upper frame 10, the left and right side frames 20, and the lower frame 30 are joined integrally by welding or the like into a single frame-shaped construction. In an inside space of the frame-like seat back frame F2, a pressure-receiving member 40 and a pair of left and right rocking mechanisms 50 which will be described later are arranged. In FIGS. 2, 3 and other drawings, the rocking mechanisms 50 are shown in simplified illustration where appropriate.

The upper frame 10 is made of a pipe bent in a substantially U-shape which comprises a lateral pipe portion 11 extending in the lateral direction, and left and right vertical pipe portions 13 extending in the upward-downward direction. On the front side of the lateral pipe portion 11, a pair of left and right support brackets 12 for use in mounting the head rest S3 is fixed by welding. The left and right vertical pipe portions 13 have their lower portions combined integrally with left and right side frame main body portions 21, respectively, to form left and right side frames 20.

The left and right side frame main body portions 21 are made by presswork or stamping of a metal sheet or otherwise formed in a substantially U-shape, and disposed opposite to each other in the lateral direction. Each side frame main body portion 21 is formed to have an upper portion thereof connected to the vertical pipe portion 13 in a such a manner that the upper portion holds the vertical pipe portion 13, and a lower portion thereof including a protruding portion 22 which juts out farther than the upper portion to the front.

Hereinbelow, the pressure-receiving member 40 and the rocking mechanisms 50 are described in detail.

The pressure-receiving member 40 is an elastically deformable sheet-like member made of resin material or the like, and disposed in a position rearwardly of an occupant between the left and right side frames 20. To be more specific, as shown in FIG. 3, the pressure-receiving member 40 includes a pressure-receiving portion 40A, support portions 41, an upper connecting wire W1 and a lower connecting wire W2. The pressure-receiving portion 40A is an example of a pressure-receiving plate configured to support a back of the occupant with the aforementioned cushion material. The support portions 41 are configured to support upper body side regions of the occupant with the aforementioned cushion material. The connecting wires W1, W2 are configured to support the pressure-receiving portion 40A from a rear side thereof.

The pressure-receiving portion 40A is formed to have a relatively large area (an area covering one third or larger of the inside space of the frame-like seat back frame F2) enough to support the back of the occupant utilizing its large-area surface. The pressure-receiving portion 40A is disposed in a position corresponding to the center of the seat back S2. The pressure-receiving portion 40A includes a second bead B2 as an example of a second projection protruding rearward.

To be more specific, the second bead B2 is shaped like a groove recessed as seen from the front, and mainly includes a plurality of up-down bead portions B21 extending in an upward-and-downward direction, and a connecting bead portion B22 extending in a lateral direction to connect the plurality of up-down bead portions B21. With this configuration, the pressure-receiving portion 40A is enhanced in rigidity by the second bead B2 formed as illustrated.

The support portions 41, which are formed integrally with the pressure-receiving portion 40A, extend from upper portions of the left and right sides of the pressure-receiving portion 40A in positions corresponding to the height of the breast of the occupant, obliquely in a leftward-and-frontward direction and in a rightward-and-frontward direction, respectively (see FIG. 2). In other words, the support portions 41 are disposed in positions corresponding to the left and right side portions of the seat back S2 jutting out from the left and right sides of the central portion thereof obliquely in frontward-and-laterally-outward directions.

Figure 7:
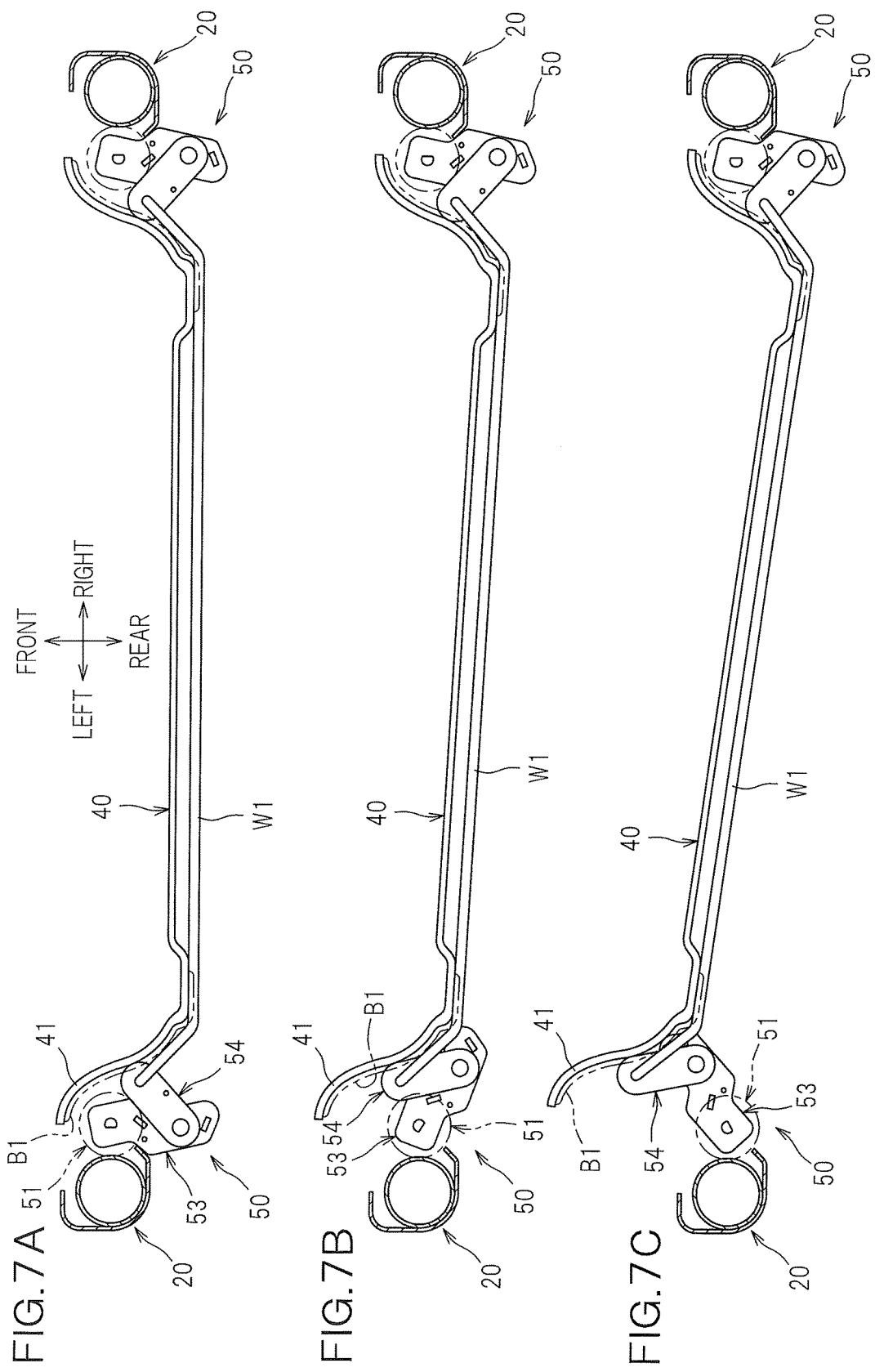
FIGS. 7A-7C are schematic views showing the motion of the rocking mechanism and a pressure-receiving member during cornering of the vehicle to the right.

The support portions 41 are, as shown in FIG. 7, disposed to face laterally to the side frames 20. With this configuration, the car seat S can be miniaturized in the front-rear direction in comparison with an alternative configuration in which the support portions and the side frames are not disposed to face to each other.

The front end portion of each support portion 41 is configured to be curved in a laterally outward direction, arcuately along the outer cylindrical surface (outer surface) of an actuator 51 which will be described later. With this configuration, the car seat S can be miniaturized in the front-rear direction in comparison with an alternative configuration in which the front end portion of each support portion is configured to extend straight obliquely in a frontward-and-laterally-outward direction.

As shown in FIG. 3, the support portions 41 include first beads B1 as an example of a first projection protruding rearward. With this feature, the rigidity of the support portion 41 can be enhanced.

To be more specific, three first beads B1 are provided in positions spaced out in an upward-downward direction. Each first bead B1 extends from a laterally outer side portion of the support portion 41 toward the second bead B2 and connected to the second bead B2 (to be more specific, connected to the laterally outermost up-down bead portion B21). With this configuration, the rigidity of boundary portions 42 of the pressure-receiving portion 40A and the support portions 41 at and around an interface therebetween (portions along boundaries indicated by lines) can be enhanced, so that deformation of the support portions 41 relative to the pressure-receiving portion 40A can be suppressed.

Each first bead B1 is tilted relative to a horizontal plane. To be more specific, the first bead B1 is formed to extend from the second bead B2 obliquely in a laterally-outward-and-upward direction. With this configuration, the load imposed from the occupant on the support portions 41 from various directions can be received efficiently by a simple structure, in comparison with an alternative structure in which the first bead is shaped like a cross.

The upper connecting wire W1 and the lower connecting wire W2 are disposed at the rear sides of the pressure-receiving portion 40A and the support portions 41, and are engaged with engageable portions (engageable claws, not shown) formed in the pressure-receiving portion 40A or the support portions 41 whereby the pressure-receiving portion 40A and the support portions 41 are supported by the connecting wires W1, W2 in such a manner that the pressure-receiving portion 40A and the support portions 41 can be moved rearward. To be more specific, left and right ends of the upper connecting wire W1 are connected to left and right rocking mechanisms 50 which will be described later, respectively. Left and right ends of the lower connecting wire W2 are connected to left and right wire support arms 23 fixed on the inner sides of the left and right side frame main body portions 21, respectively. These wire support arms 23 are configured to rock rearward.

With this configuration, when the vehicle is rear-ended and a rear-end collision load is imposed to the vehicle from the rear, or on like occasions, a rearward load (rearward motion load) is imposed on the pressure-receiving portion 40A and the support portions 41, but a load imposed on the occupant can be absorbed by the rearward motion of the pressure-receiving portion 40A and the support portions 41 which results from deformation of the left and right bent portions of upper connecting wire W1, and rearward movement of the left and right end portions of the lower connecting wire W2 by the rocking motion of the left and right wire support arms 23. Each wire support arm 23 is configured to make a rocking motion to the rear in response to a rearward motion load having a predetermined value or greater, by a known mechanism using an extension coil spring (not shown).

The rocking mechanisms 50 are disposed at the left and right sides of the pressure-receiving member 40, and configured to cause the left side (left end) or the right side (right end) of the pressure-receiving member 40 to move frontward and rearward. To be more specific, the rocking mechanisms 40 are regulated under control of a controller (not shown), and configured to cause the pressure-receiving member 40 to rock in the same direction as the direction of cornering of the vehicle. With this configuration, the load (centrifugal force) imposed on the occupant can be received effectively by the pressure-receiving member 40.

The method of control exercised by the controller may be selected from various alternatives. To give an example, a lateral acceleration and a direction of cornering may be calculated, for example, based upon signals outputted from wheel speed sensors and a steering angle sensor, so that one of the rocking mechanisms 50 disposed at an outside in the direction of cornering is actuated if the lateral acceleration is beyond a predetermined threshold, whereby an outer end portion (on the outer side in the direction of cornering) of the pressure-receiving member 40 is pushed frontward by the rocking mechanism.

Figure 4:
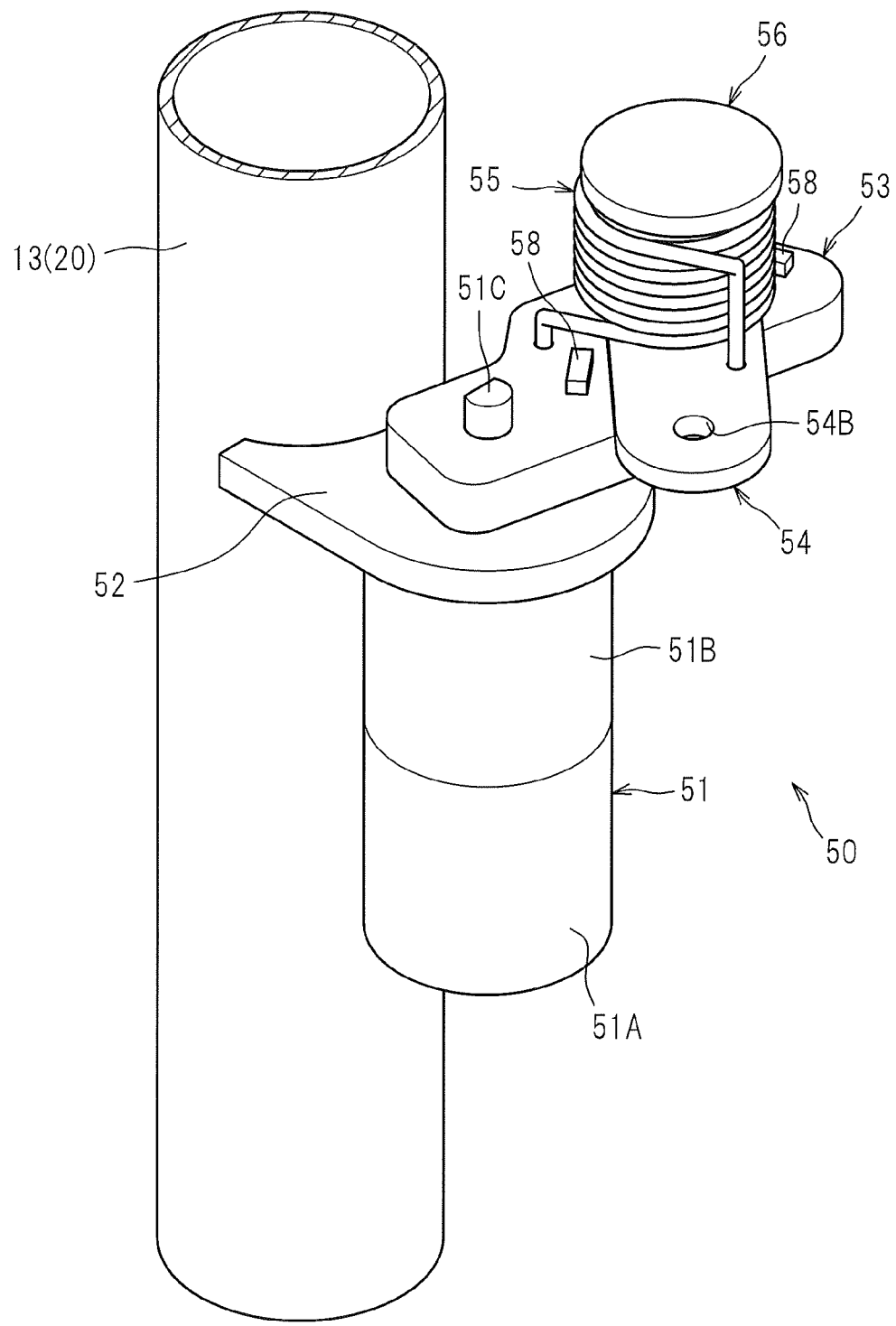
FIG. 4 is an enlarged perspective view showing a rocking mechanism.
Figure 5:
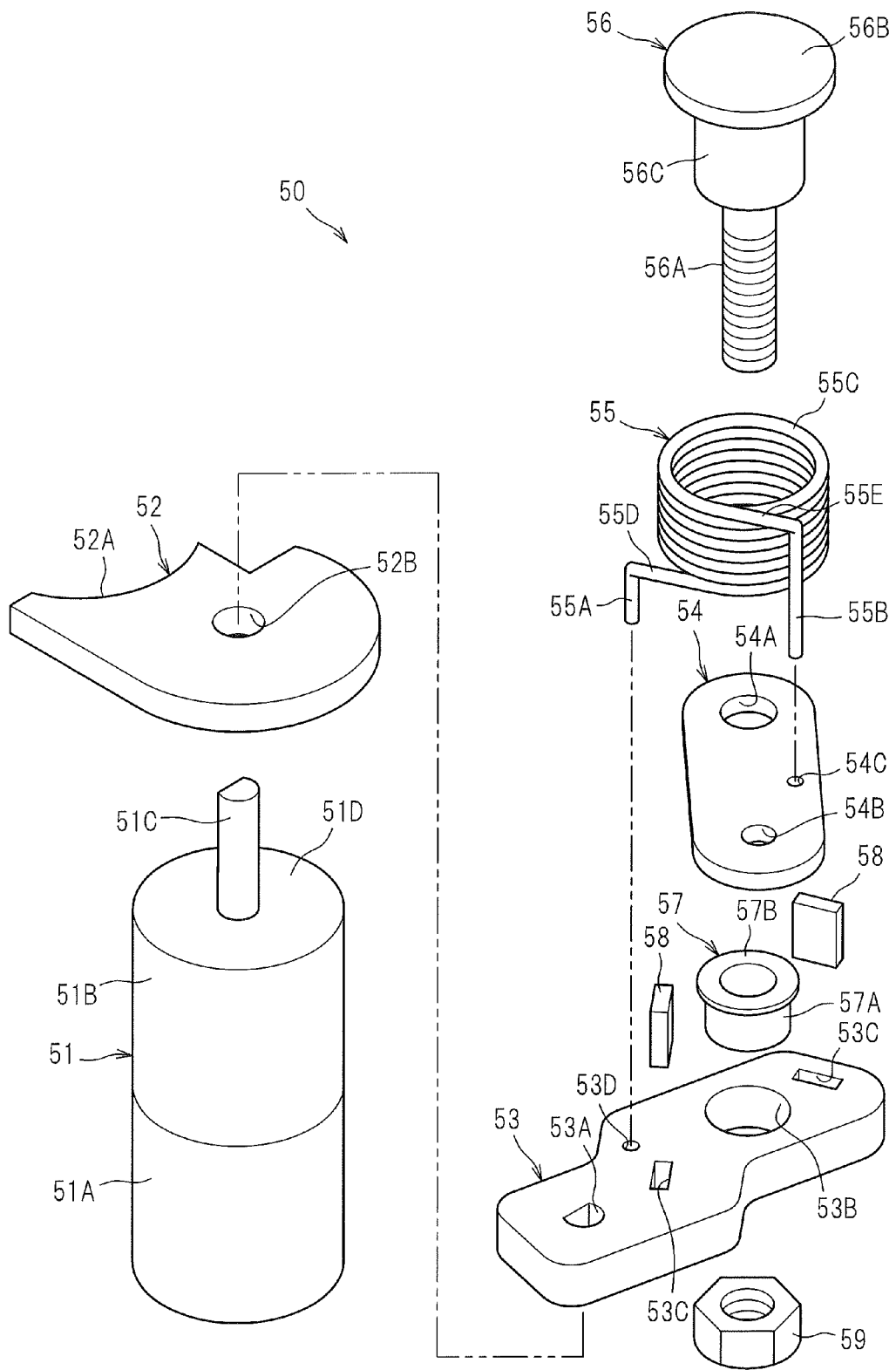
FIG. 5 is an exploded perspective view showing parts of the rocking mechanism.

As shown in FIGS. 4 and 5, each rocking mechanism 50 mainly includes an actuator 51, a holding bracket 52, a first link member 53 and a second link member 54 which are adopted as an example of a pressing member, and a torsion spring 55 as an example of a biasing member.

The actuator 51 is a source of actuation for the first link member 53 and the second link member 54 to pivot, and formed in a shape elongated in the upward-downward direction. To be more specific, the actuator 51 includes a stepping motor 51A, a gear box 51B, and an output shaft 51C. The output shaft 51C is disposed to orient in the upward-downward direction. A driving force outputted from the stepping motor 51A is decelerated at the gear box 51B, and transmitted to the output shaft 51C, so that the output shaft 51C turns to a predetermined angle.

The actuator 51 is, as shown in FIG. 3, disposed rearwardly of the support portion 41 of the pressure-receiving member 40 so as to overlap the support portion 41 as viewed in the front-rear direction. With this configuration, the car seat S can be miniaturized in the upward-downward direction or in the lateral direction, for example, in comparison with an alternative configuration in which the actuator is disposed so as not to overlap the support portion as viewed in the front-rear direction.

The actuator 51 is disposed at a laterally inner side of the side frame 20. With this arrangement, the car seat S can be miniaturized in the lateral direction, for example, in comparison with an alternative configuration in which the actuator is disposed at a laterally outer side of the side frame.

The actuator 51 has an elongated shape of which a longitudinal direction is arranged along the side frame 20 (the corresponding cylindrical vertical pipe portion 13 thereof). With this configuration, the car seat S can be miniaturized in the front-rear direction, for example, in comparison with an alternative configuration in which the elongated actuator is tilted in the front-rear direction (i.e., ends of the actuator protrude in the front-rear direction away from the side frame).

As shown in FIG. 7, the actuator 51 is disposed between the side frame 20 and the support portion 41 in the lateral direction. With this arrangement, the car seat can be miniaturized in the front-rear direction, for example, in comparison with the actuator is not disposed between the support frame and the side frame.

The actuator 51 is disposed separate from the first bead B1 formed in the support portion 41. With this arrangement, the actuator 51 can be prevented from being damaged by the first bead B1 which would interfere with the actuator 51 if the actuator is in contact with the first bead.

As shown in FIGS. 4 and 5, the holding bracket 52 is configured to have a substantially semicircular plate-like member of which an arcuate mount surface 52A is welded or otherwise fixed to the vertical pipe portion 13 (of the side frame 20). The holding bracket 52 has a through hole 52B through which the output shaft 51C of the actuator 51 is disposed. An upper end surface 51D of the actuator 51 is fixed to an undersurface of the holding bracket 52 by a screw or the like (not shown).

The first link member 53 is a plate-like member having an elongated shape. One end portion of the first link member 53 is fixed to the output shaft 51C of the actuator 51 so that the other end portion of the first link member 53 can be caused to pivot on the output shaft 51C in the front-rear direction (see FIG. 6). In other words, the first link member 53 is pivotable relative to the side frame 20.

To be more specific, one end portion of the first link member 53 has an engageable hole 53A having a D-shaped cross section and rendered engageable with an end portion of the output shaft 51 which also has a D-shaped cross section. The other end portion of the first link member 53 has an insertion hole 53B in which a shoulder bolt 56 and a collar 57 are inserted. The shoulder bolt 56 provides a pivot of the second link member 54. The first link member 53 also has two rectangular holes 53C of which one is provided at a side of the insertion hole 53B closer to the one end portion of the first link member 53 and the other is provided at an opposite side of the insertion hole 53B closer to the other end portion of the first link member 53. Rectangular parallelepiped plate-like restriction walls 58 are fitted and fixed in these rectangular holes 53C, respectively, so that pivoting motion of the second link member 54 is restricted by these restriction walls 58.

With this configuration, excessive pivoting motion of the second link member 54 relative to the first link member 53 can be restricted. Moreover, the first link member 53 has a fixing hole 53D formed between the engageable hole 53A and the insertion hole 53B. One end portion 55A of the torsion spring 55 is fixed in this fixing hole 53D.

The second link member 54 is pivotally provided on the first link member 53 by the shoulder bolt 56, the collar 57 and the nut 59 described above. To be more specific, the shoulder bolt 56 includes a shaft portion 56A, a head portion 56B and a middle diameter portion 56C which has a diameter larger than that of the shaft portion 56A and smaller than that of the head portion 56B. One end portion of the second link member 54 has an insertion hole 54A in which the shaft portion 56A of the shoulder bolt 56 is inserted.

The collar 57 is pivotally supported in the insertion hole 53B of the first link member 53. The collar 57 includes a cylindrical portion 57A in which the shaft portion 56A of the shoulder bolt 56 is inserted, and a flange portion 57B protruding outward, radially from an upper end of the cylindrical portion 57A. The cylindrical portion 57A is sized to slightly protrude from the undersurface of the first link member 53 when the flange portion 57B of the collar 57 fitted in the insertion hole 53B abuts on the upper surface of the first link member 53.

The flange portion 57B serves to support the second link member 54 by holding the same between the flange portion 57B and the middle diameter portion 56C of the shoulder bolt 56, and also serves as a stopper which prevents the collar 57 from coming off from the first link member 53 downward. The nut 59 is fastened at the lower end of the collar 57 by screwing on the shaft portion 56A (threaded portion) of the shoulder bolt 56 protruding downward from the lower end of the cylindrical portion 57A of the collar 57. Thus, the nut 59 fastened at the collar 57 serves as a stopper which prevents the collar 57 from coming off from the first link member 53 upward.

Figure 6:
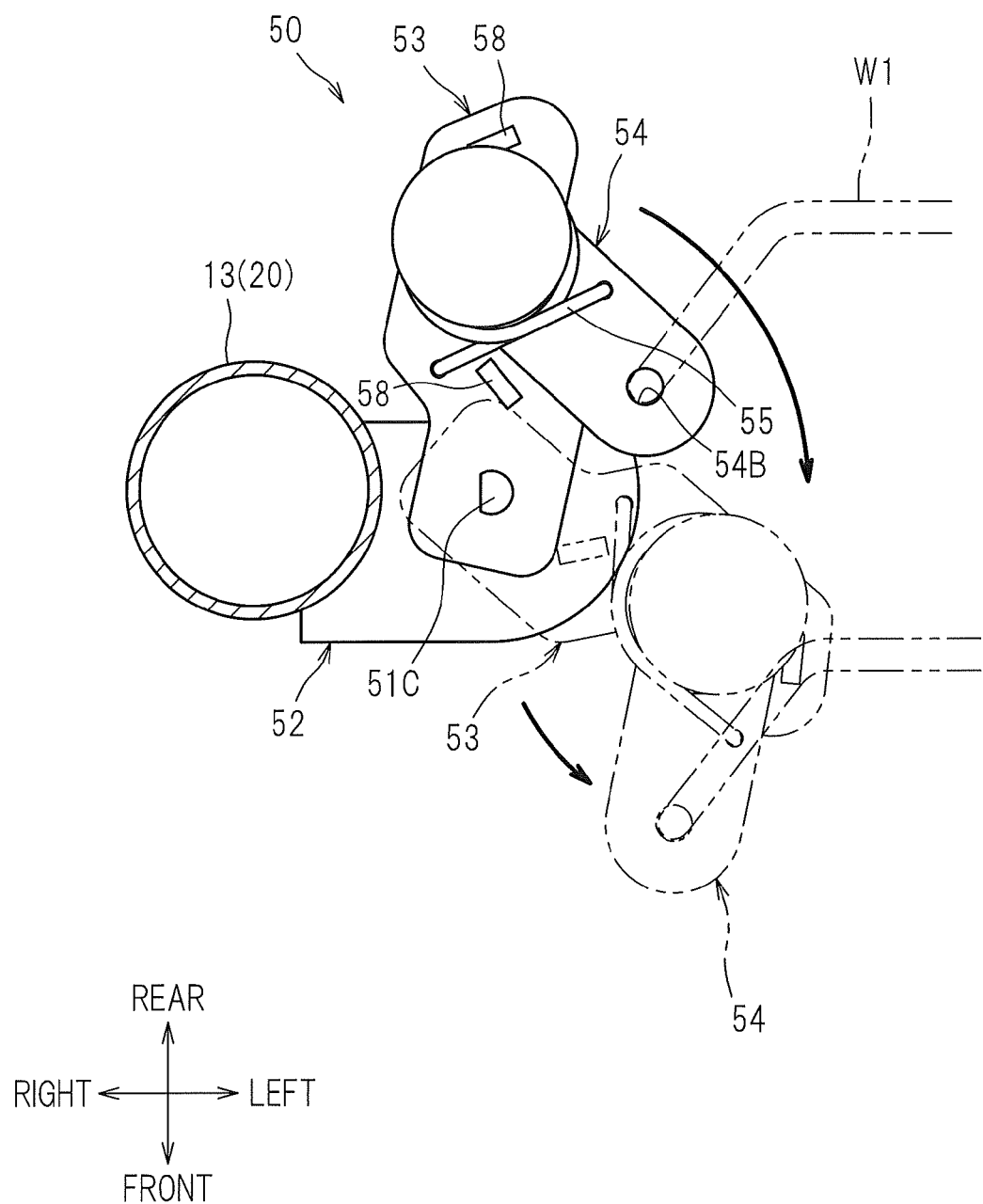
FIG. 6 is a plan view for explaining an operation of the rocking mechanism.

In this way, the second link member 54, together with the shoulder bolt 56, the collar 57 and the nut 59, is pivotable relative to the first link member 53. The other end portion (an end portion opposite to the end portion in which the insertion hole 54A is provided; hereinafter referred to simply as the end portion) of the second link member 54 has a connection hole 54B in which the end of the aforementioned upper connecting wire W1 is swingably engaged, as shown in FIG. 6.

With this configuration, when the first link member 53 is caused to pivot frontward from an initial position (indicated by solid lines) at the rear, the end portion of the second link member 54 is prevented from moving toward a laterally outward direction by the upper connecting wire W1, and thus the second link member 54 is caused to pivot in a direction away from the first link member 53 (so as to open). On the other hand, when the first link member 53 is caused to pivot from the front position (indicated by chain double-dashed lines) to the initial position, the second link member 54 is caused to pivot toward the first link member 53 (so as to close) by a torsion spring 55 which will be described later.

As shown in FIG. 5, a portion of the second link member 54 between the insertion hole 54A and the connection hole 54B has a fixing hole 54C in which the other end portion 55B of the torsion spring 55 is fixed.

The torsion spring 55 is disposed between the first link member 53 and the second link member 54 (in the mechanical sense of the term), and configured to generate a biasing force pulling the first link member 53 and the second link member 54 closer to each other. In other words, the torsion spring 55 is configured to bias the second link member 54 toward the initial position (the position indicated by solid lines in FIG. 6) relative to the first link member 53. With this configuration, the second link member 54 can be returned to the initial position by the biasing force of the torsion spring 55.

To be more specific, the torsion spring includes a coiled portion 55C, an L-shaped first aim portion 55D extending from a lower end of the coiled portion 55C in a radially outward direction and bent to extend downward, and an L-shaped second arm portion 55E extending from an upper end of the coiled portion 55C in a radially outward direction and bent to extend downward.

The coiled portion 55C of the torsion spring 55 is disposed to enclose (surround) the middle diameter portion 56C (a rotary shaft of the second link member 54 by which the second link member 54 is pivoted on the first link member 53) of the shoulder bolt 56. With this configuration, the rocking mechanism 50 can be miniaturized easily, for example, in comparison with an alternative configuration in which the coiled portion of the torsion spring is disposed so as not to enclose the rotary shaft of the second link member.

The rocking mechanism 50 configured as described above operates, for example, as shown in FIGS. 7A-7C. When the vehicle is operated to turn (corner) to the right (clockwise in the drawing), the left rocking mechanism 50 is actuated to pivot frontward, to thereby cause the pressure-receiving member 40 to pivot clockwise in the drawing. In this operation, since the second link member 54 is provided between the end portion of the first link member 53 and the upper connecting wire W1, the stroke of frontward movement of the left end of the upper connecting wire W1 is greater, for example, in comparison with an alternative configuration in which the second link is not provided and the first link is connected directly to the upper connecting wire. Accordingly, the pressure-receiving member 40 is caused to move (rock) to a greater extent, so that the centrifugal force applied to the occupant during cornering of the vehicle can be received effectively by the pressure-receiving member.

The second link member 54 is arranged to contact the support portion 41 continuously during its pivoting motion from the initial position shown in FIG. 7A to the frontmost position shown in FIG. 7C. With this arrangement, the load imposed on the support portion 41 from the occupant can be received more effectively by the second link member 54, for example, in comparison with an alternative configuration in which the load imposed on the support portion from the occupant is received by the upper connecting wire.

Figure 8:
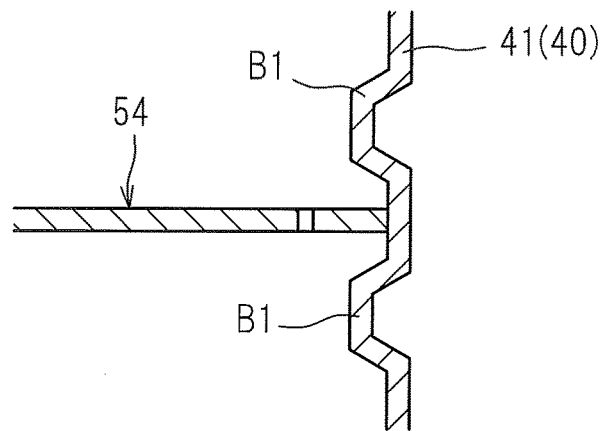
FIG. 8 is a sectional view showing a second link member in contact with a portion between two first beads.

Particularly, in the present embodiment, as shown in FIG. 8, the second link member 54 is in contact with a region of the support portion between the two first beads B1. With this configuration, an undesirable dislocation of the second link member 54 upward or downward (i.e., in the direction of arrangement of the two first beads B1) can be blocked by these first beads B1.

In the configurations described above, in addition to the aforementioned advantages, the following advantageous effects can be achieved.

Since the second link member 54 is connected to the upper connecting wire W1, the structure of the connected portions of the second link member and the pressure-receiving portion 40A can be simplified, for example, in comparison with an alternative configuration in which the second link member is connected to the pressure-receiving plate.

Since the end portion of the upper connecting wire W1 is engaged with the connection hole 54B formed in the end portion of the second link member 54 to thereby connect the upper connecting wire W1 and the second link member 54, the structure can be simplified, for example, in comparison with an alternative configuration in which an end portion of the connecting wire is bent into an annular shape and this end portion is hanged on a hook-shaped portion formed on the second link member.

Since the pressure-receiving member 40 is elastically deformable, the pressure-receiving member 40 can be deformed to fit the occupant, so that the centrifugal force applied to the occupant can be received more effectively by the pressure-receiving member 40.

Since the broad surface of the pressure-receiving portion 40A is applied to support the back of the occupant, the occupant is less likely feel uncomfortable, for example, in comparison with a case with a conventional configuration in which a pressure-receiving member is shaped like a rectangular bar.

Although the exemplary embodiment of the present invention has been described above, the present invention may be carried out into practice in various other ways, as will be described below. In the following description, the same elements as in the above-described embodiment will be designated by the same reference numerals, and a duplicate description thereof will be omitted.

Figure 9:
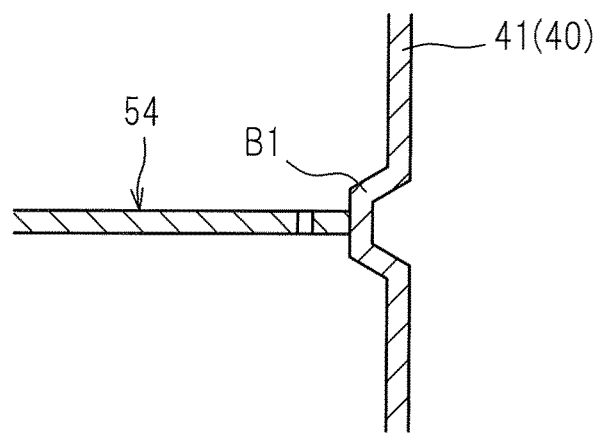
FIG. 9 is a sectional view showing the second link member in contact with a first bead.

In the above-described embodiment, the second link member 54 is arranged to contact the region of the support portion 41 between two first beads B1, but the present invention is not limited to this arrangement; as shown in FIG. 9, the second link member 54 may be arranged to contact the first bead B1. With this arrangement, the high-rigidity part of the support portion 41 (i.e., the first bead 54) is supported by the second link member 54, and thus the load imposed on the support portion 42 from the occupant can be received effectively by the second link member 54.

Figure 10:
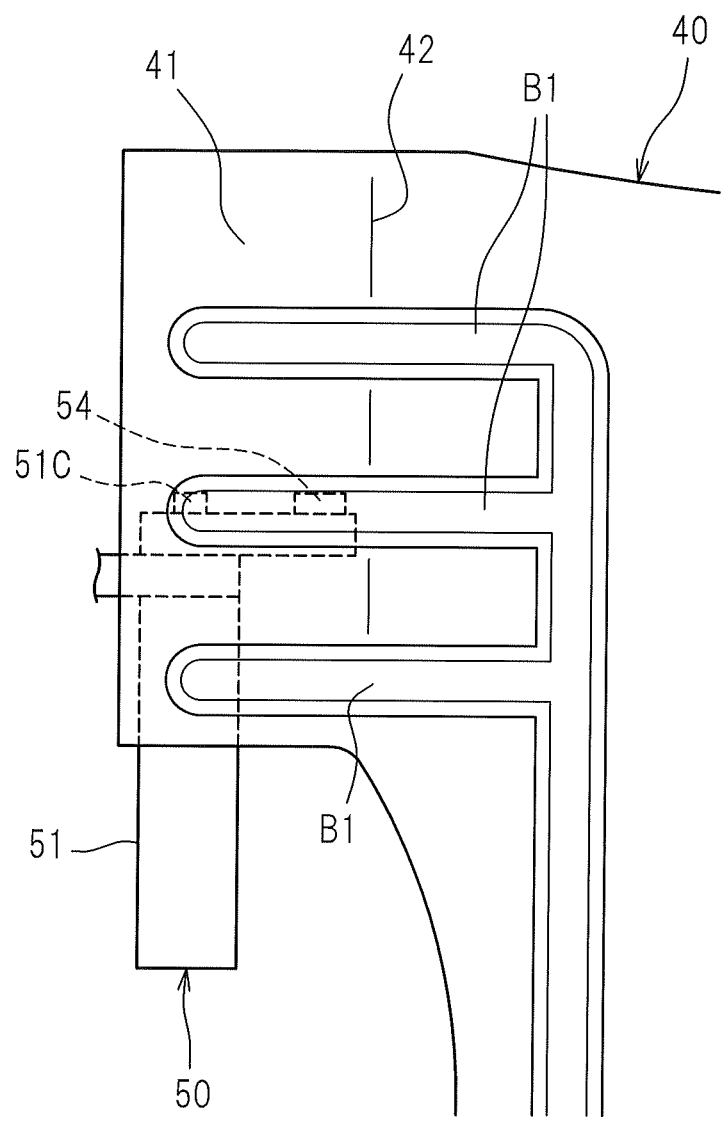
FIG. 10 is an enlarged view showing an embodiment in which first beads are formed horizontally.

In the above-described embodiment, the first bead B1 is tilted relative to the horizontal plane, but the present invention is not limited to this configuration; as shown in FIG. 10, the first bead B1 may be formed along a direction parallel to the horizontal plane. In this alternative configuration, it is preferable that the rocking mechanism 50 be arranged such that the output shaft 51C of the actuator 51 is disposed along the upward-downward direction, as in the above-described embodiment.

In other words, the second link member 54 may preferably but not necessarily be configured to pivot in a horizontal plane. In this configuration, for example, as shown in FIG. 10, the second link member 54 caused to pivot can be prevented from getting disengaged from the first bead B1, and thus the first bead 1 can be supported reliably by the second link member 54. Moreover, for example, if the second link member is configured to contact the region of the support portion 41 between the first beads, the second link member can be prevented from getting disengaged from the region between the first beads with greater reliability.

Figure 11A:
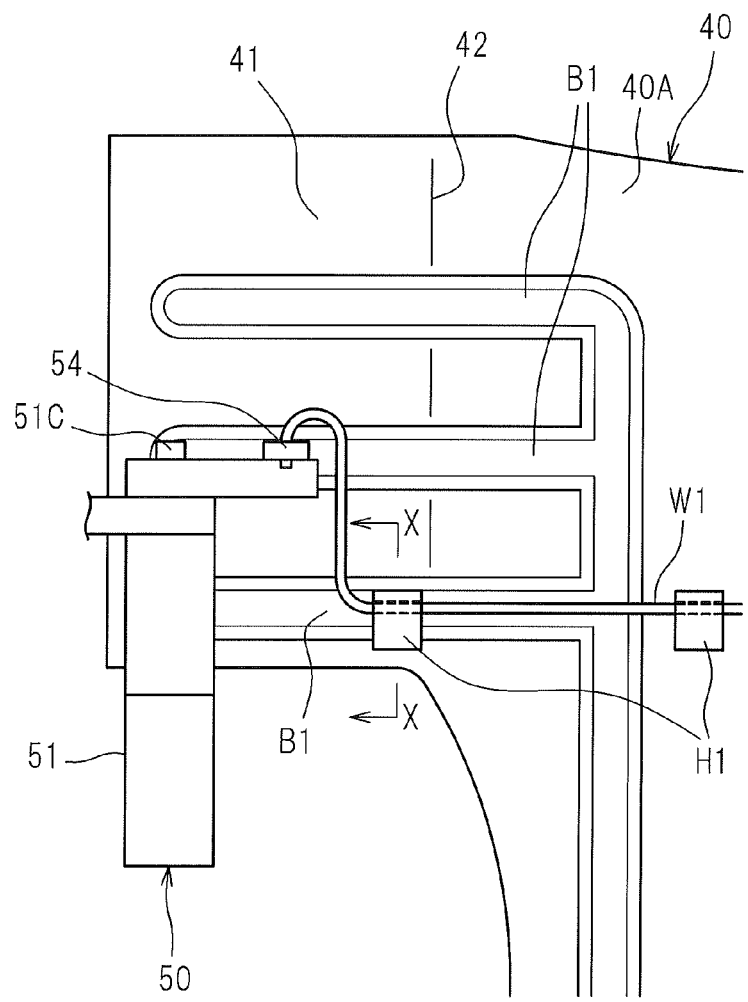
FIG. 11A is an enlarged view showing an embodiment in which an engageable claw is provided on a first bead.

In the above-described embodiment, the engageable claws (not shown) configured to engage with the connecting wires W1, W2 are provided in the pressure-receiving portion 40A so that the pressure-receiving portion 40A is supported by the connecting wires W1, W2, but the present invention is not limited to this configuration; for example, as shown in FIG. 11A, an engageable claw H1 which is engageable with the upper connecting wire W1 may not only be formed in the pressure-receiving member 40A, but also be formed in the support portion 41.

Figure 11B:
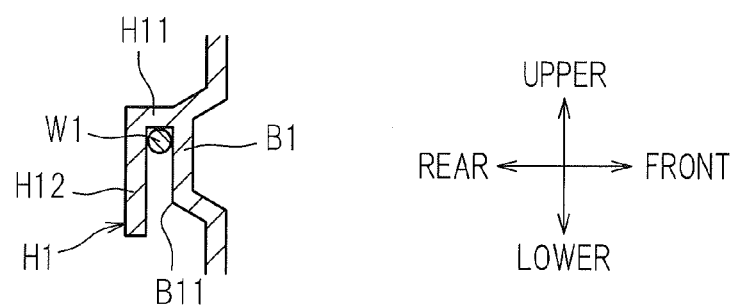
FIG. 11B is a sectional view taken along line X-X of FIG. 11A.

Furthermore, in this configuration, the engageable claw H1 may preferably but not necessarily be formed on, and integrally with, the first bead B1, as shown in FIG. 11B. With this additional feature, the support portion 41 can be caused to rock effectively by the upper connecting wire W1 engaged with the engageable claw H1 formed integrally with the first bead B1 (high-rigidity portion) of the support portion 41 because the upper connecting wire W1 engaged with the engageable claw H1 presses the high-rigidity projection.

To be more specific, the engageable claw H1 is shaped like a letter L in cross section with a base portion H11 extending rearward from the first bead B1, and a claw portion H12 extending downward from the rear end of the base portion H11. The claw portion extends downward beyond a lower edge B11 of the first bead B1. With this configuration, in which the claw portion H12 extends downward beyond the lower edge B11 of the first bead B1, the risk of disengagement of the upper connecting wire W1 from the engageable claw H1 can be reduced.

Figure 12:
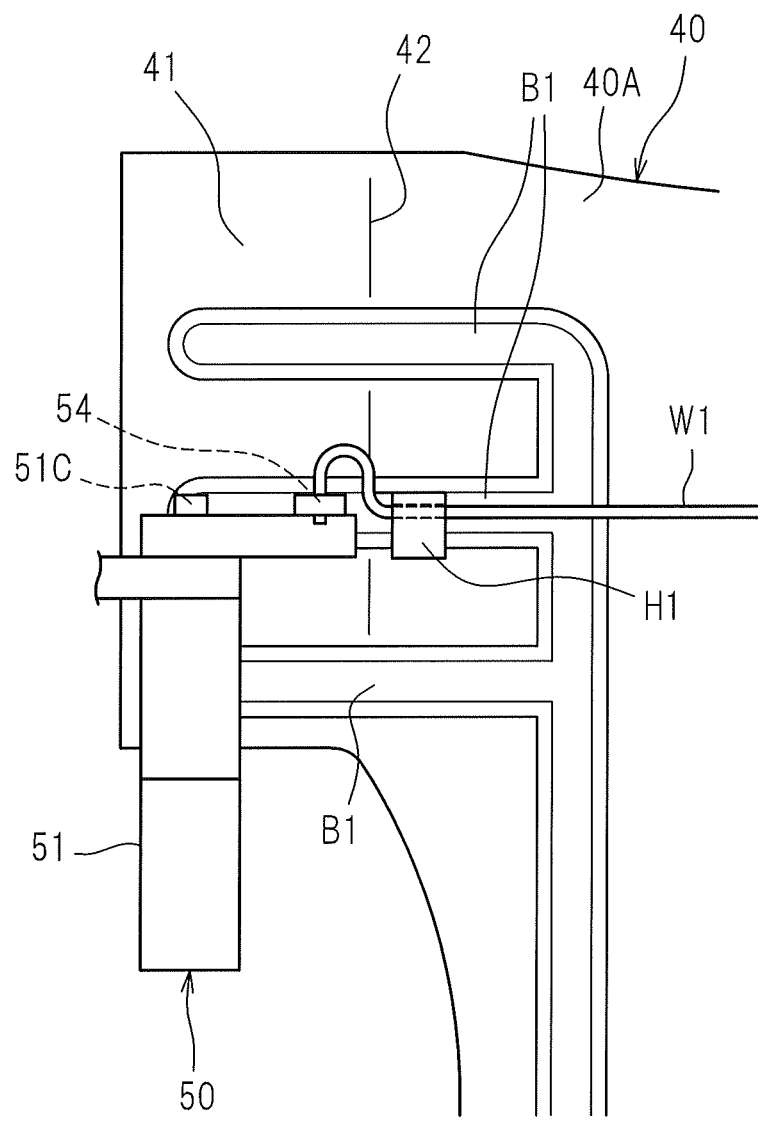
FIG. 12 is an enlarged view showing an embodiment in which an engageable claw is provided at a laterally outer end portion of the pressure-receiving portion.

It is preferable that the engageable claw H1 provided in the pressure-receiving portion 40A is, as shown in FIG. 12, disposed adjacent to the laterally outer side (at or near the boundary 42 between the pressure-receiving portion 40A and the support portion 41). With this configuration, the laterally outer side of the pressure-receiving portion 40A can be pressed by the upper connecting wire W1, so that the pressure-receiving portion 40A can be caused to move (rock) by the upper connecting wire W1 effectively.

In the above-described embodiment, the outer surface of the actuator 51 is cylindrical, but the present invention is not limited to this shape; for example, the outer surface of the actuator 51 may be a polygonal or prismatic shape. In such an alternative configuration, as well the support portion may be formed to fit the polygonal or prismatic outer surface of the actuator.

In the above-described embodiment, the pressure-receiving portion 40A and the support portions 41 are formed integrally in a single-piece construction, but the present invention is not limited to this configuration; the pressure-receiving portion and the support portions may be formed as discrete parts.

In the above-described embodiment, each of the first bead B1 and the second bead B2 illustrated as a projection (first projection and second projection) is a hollow groove as viewed from its front side, but the present invention is not limited to this structure; for example, the projection may be solid (not recessed as viewed from its front).

In the above-described embodiment, the pressing member configured to press the left end portion or the right end portion of the pressure-receiving member 40 is comprised of two link members 53, 54, but an alternative configuration with one, three or more link members constituting the pressing member is conceivable. In this configuration, the pressing member is not limited to such a link member as to be pivoted on the side frame; for example, any member movable in the front-rear direction relative to a seat back frame such as side frames may be used as a pressing member.

In the above-described embodiment, the second link member 54 is arranged to contact the support portion 41 continuously during its pivoting motion from the initial position to the frontmost position, but the present invention is not limited to this specific configuration; if the second link member 54 is configured to contact the support portion 41 at least when the pressure-receiving member 40 is in the frontmost position, a desired advantage can be achieved. In this configuration, as well, the second link member 54 can support the support portion 41 when the pressure-receiving member 40 is in the frontmost position, and thus the centrifugal force imposed on the occupant during cornering of the vehicle can be effectively received by the second link member 54.

In the above-described embodiment, one rocking mechanism 50 is composed of two link members 53, 54, but one, three or more link members may be arranged to form a rocking mechanism. To be more specific, the rocking mechanism may be implemented by the first link member configured to be pivotable on the seat back frame (typically, the side frame), and thus one or more link members may be provided between the first link member and the second link member.

In the above-described embodiment, the link members 53, 54 which constitute the rocking mechanism 50 are configured to horizontally pivot on an axis orienting in a substantially vertical direction, but the present invention is not limited to this specific configuration; all or some of the link members provided may be configured to pivot on an axis orienting in a substantially horizontal direction. The axis of the pivoting motion of the link member may be arranged to orient obliquely.

In the above-described embodiment, the biasing member disposed between the two link members is illustrated in the form of a torsion spring 55 by way of example, but the present invention is not limited to this specific configuration; any other type of biasing member may be applicable, which may include a leaf spring, a wire spring, etc.

Specific configuration of the seat frame F (seat cushion frame F1 and seat back frame F2) adopted in accordance with the above-described embodiment is illustrated only by way of example, and the present invention is not limited to the configuration of the above-described embodiment. For example, in the above-described embodiment, each of the left and right side frames 20 of the seat back frame F2 is composed of the vertical pipe portion 13 shaped like a pipe and a side frame main body portion 21 shaped like a sheet, but the present invention is not limited to this configuration; the side frame may be formed only by a frame shaped like a pipe, or only by a frame shaped like a sheet.

In the above-described embodiment, the car seat S for use in an automobile is illustrated as an example of a vehicle seat, but the vehicle seat to which the present invention is applicable is not limited to the illustrated car seat. For example, a seat for a vessel (a ship or a boat), a seat for an aircraft, or other vehicles may be advantageously configured in accordance with the present invention.

In the above-described embodiment, the pressure-receiving portion 40A and the support portions 41 are formed integrally in a single-piece construction, but the present invention is not limited to this configuration; the pressure-receiving portion and the support portions may be configured as discrete parts.

What is claimed is:

1. A vehicle seat, comprising:
a seat cushion;
a seat back which includes left and right side frames;
a pressure-receiving member disposed rearwardly of an occupant between the left and right side frames; and
a rocking mechanism configured to cause a left side or a right side of the pressure-receiving member to move frontward and rearward,
wherein the pressure-receiving member includes a pressure-receiving portion configured to support a back of the occupant, and a pair of support portions provided at left and right end portions of the pressure-receiving member and extending in a leftward-and-frontward direction and in a rightward-and-frontward direction, respectively, to support upper body side regions of the occupant, wherein the rocking mechanism includes:

a pressing member configured to press the left or right end portion of the pressure-receiving member in a front-rear direction; and an actuator configured to actuate the pressing member, wherein the actuator is disposed rearwardly of a corresponding support portion, to overlap the support portion as viewed in the front-rear direction, and the actuator has an axis, the actuator being configured to cause the pressing member to pivot about the axis.

2. The vehicle seat according to claim 1, wherein the actuator is disposed at a laterally inner side of a corresponding side frame.

3. The vehicle seat according to claim 1, wherein the actuator has an elongated shape of which a longitudinal direction is arranged along a corresponding side frame.

4. The vehicle seat according to claim 1, wherein each support portion is disposed laterally opposite to a corresponding side frame, and wherein the actuator is disposed between the support portion and the corresponding side frame in a lateral direction.

5. The vehicle seat according to claim 1, wherein a front end portion of each support portion extends along an outer surface of the actuator in a laterally outside direction.

6. The vehicle seat according to claim 1, wherein each support portion includes a projection protruding rearward, and wherein the actuator is separate from the projection.

7. The vehicle seat according to claim 6, wherein the pressure-receiving member further includes a connecting wire configured to support the pressure-receiving portion and the support portions from rear sides thereof, an end portion of the connecting wire being connected with the pressing member, wherein the pressure-receiving portion and the support portions include engageable claws configured to engage with the connecting wire whereby the pressure-receiving member is supported by the connecting wire, and wherein an engageable claw provided in each support portion is formed integrally with the projection in a single-piece construction.

8. The vehicle seat according to claim 7, wherein the engageable claw provided in each support portion includes a base portion extending rearward from the projection, and a claw portion extending from a rear end of the base portion downward beyond a lower edge of the projection.

9. The vehicle seat according to claim 6, wherein the projection includes a first portion and a second portion that are arranged separate from each other, and wherein the pressing member is disposed between the first portion and the second portion.

10. The vehicle seat according to claim 9, wherein the pressing member is configured to contact a portion of a corresponding support portion between the first portion and the second portion of the projection at least when the pressure-receiving member is in a frontmost position.

11. The vehicle seat according to claim 6, wherein the pressing member is configured to contact the projection.

12. The vehicle seat according to claim 6, wherein the pressure-receiving portion and the support portions are formed integrally in a single-piece construction, and wherein the pressure-receiving portion includes a second projection protruding rearward, the second projection being continuous with the projection provided in each support portion.

13. The vehicle seat according to claim 1, wherein the pressure-receiving member further includes a connecting wire configured to support the pressure-receiving portion from a rear side thereof, an end portion of the connecting wire being connected with the pressing member, wherein the pressure-receiving portion includes an engageable claw configured to engage with the connecting wire whereby the pressure-receiving member is supported by the connecting wire, and wherein the engageable claw is provided at a laterally outer end portion of the pressure-receiving portion.

14. The vehicle seat according to claim 1, wherein the actuator includes a motor.

15. The vehicle seat according to claim 14, wherein the rocking mechanism further includes a biasing member configured to bias the pressing member toward an initial position thereof.

16. The vehicle seat according to claim 1, wherein the pressing member is arranged to contact a corresponding support portion.

17. The vehicle seat according to claim 16, wherein the pressure-receiving member further includes a connecting wire configured to support the pressure-receiving portion from a rear side thereof, an end portion of the connecting wire being connected with the pressing member.

18. The vehicle seat according to claim 16, wherein the pressing member is configured to contact the support portion at least when the pressure-receiving member is in a frontmost position.

19. A vehicle seat comprising:

a seat cushion;

a seat back which includes left and right side frames;

a pressure-receiving member disposed between the left and right side frames, the pressure-receiving member being configured to support an upper body of an occupant; and a rocking mechanism configured to cause a left side or a right side of the pressure-receiving member to move frontward and rearward, wherein the rocking mechanism includes:

a pressing member configured to press a left or right end portion of the pressure-receiving member in a front-rear direction; and an actuator configured to actuate the pressing member, and wherein the actuator is disposed to overlap the left or right end portion of the pressure-receiving member as viewed in the front-rear direction, and the actuator has an axis, the actuator being configured to cause the pressing member to pivot about the axis.

20. A vehicle seat, comprising:

a seat cushion;

a seat back which includes left and right side frames;

a pressure-receiving member disposed rearwardly of an occupant between the left and right side frames; and a rocking mechanism configured to cause a left side or a right side of the pressure-receiving member to move frontward and rearward, wherein the pressure-receiving member includes a pressure-receiving portion configured to support a back of the occupant, and a pair of support portions provided at left and right end portions of the pressure-receiving member and extending in a leftward-and-frontward direction and in a rightward-and-frontward direction, respectively, to support upper body side regions of the occupant, wherein the rocking mechanism includes:

a pressing member configured to press the left or right end portion of the pressure-receiving member in a front-rear direction; and an actuator configured to actuate the pressing member, wherein the actuator is disposed rearwardly of a corresponding support portion, to overlap the support portion as viewed in the front-rear direction, the actuator includes a motor, and the rocking mechanism further includes a biasing member configured to bias the pressing member toward an initial position thereof.

* * * * *